(12) United States Patent
Chistyakov et al.

(10) Patent No.: US 9,722,326 B2
(45) Date of Patent: Aug. 1, 2017

(54) CIRCULAR BASE STATION ANTENNA ARRAY AND METHOD OF RECONFIGURING A RADIATION PATTERN

(71) Applicant: CommScope Technologies LLC, Hickory, NC (US)

(72) Inventors: Nikolay Chistyakov, Plano, TX (US); Scott Lynn Michaelis, Plano, TX (US); Zoya Balter, Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 85 days.

(21) Appl. No.: 14/668,037

(22) Filed: Mar. 25, 2015

(65) Prior Publication Data

US 2016/0285174 A1    Sep. 29, 2016

(51) Int. Cl.
| | |
|---|---|
| *H01Q 21/08* | (2006.01) |
| *H01Q 21/29* | (2006.01) |
| *H01Q 1/24* | (2006.01) |
| *H01Q 3/26* | (2006.01) |
| *H01Q 21/20* | (2006.01) |
| *H01Q 1/44* | (2006.01) |

(52) U.S. Cl.
CPC ............. *H01Q 21/29* (2013.01); *H01Q 1/246* (2013.01); *H01Q 3/26* (2013.01); *H01Q 21/20* (2013.01); *H01Q 21/205* (2013.01); *H01Q 1/44* (2013.01)

(58) Field of Classification Search
CPC ........................................................ H01Q 21/19
USPC ........................................................ 343/824
See application file for complete search history.

(56) References Cited

U.S. PATENT DOCUMENTS

| | | | | |
|---|---|---|---|---|
| 3,594,798 | A * | 7/1971 | Leydorf | H01Q 1/04 343/719 |
| 4,687,445 | A * | 8/1987 | Williams | H01Q 1/04 343/719 |
| 6,281,849 | B1 * | 8/2001 | Brachat | H01Q 21/24 343/700 MS |
| 6,654,590 | B2 | 11/2003 | Boros et al. | |
| 6,735,182 | B1 | 5/2004 | Nishimori et al. | |
| 6,894,653 | B2 | 5/2005 | Chiang et al. | |
| 7,031,719 | B2 | 4/2006 | Miyano et al. | |
| 7,057,573 | B2 | 6/2006 | Ohira | |
| 7,079,868 | B2 | 7/2006 | Guo | |
| 7,109,929 | B1 | 9/2006 | Ryken, Jr. et al. | |
| 7,203,469 | B2 | 4/2007 | Yamaguchi et al. | |
| 7,298,332 | B2 | 11/2007 | Ryken et al. | |
| 7,702,287 | B2 | 4/2010 | Kitahara | |
| 8,068,068 | B2 * | 11/2011 | Kish | H01Q 3/242 343/876 |

(Continued)

OTHER PUBLICATIONS

Harpreet S. Dhillon, "Modeling and Analysis of K-Tier Downlink Heterogeneous Cellular Networks," IEEE, Dec. 23, 2012, Admitted Prior Art.

(Continued)

*Primary Examiner* — Huedung Mancuso
(74) *Attorney, Agent, or Firm* — Myers Bigel, P.A.

(57) ABSTRACT

Aspects of the present disclosure may be directed to a reconfigurable antenna system including a reconfigurable antenna capable of providing various types of radiation patterns without having to be replaced or needing its orientation changed. The reconfigurable antenna may create various types of quasi-omni directional radiation patterns of different shapes depending on the environment.

21 Claims, 13 Drawing Sheets

(56) References Cited

U.S. PATENT DOCUMENTS

| | | | |
|---|---|---|---|
| 8,165,595 B2 | 4/2012 | Xia et al. | |
| 8,290,443 B2 | 10/2012 | Stirling-Gallacher et al. | |
| 8,515,493 B1 | 8/2013 | Jensen et al. | |
| 8,779,976 B2 | 7/2014 | Eom et al. | |
| 8,810,465 B2 | 8/2014 | Knadle et al. | |
| 8,811,525 B2 | 8/2014 | Eom et al. | |
| 8,830,133 B2 | 9/2014 | Weily et al. | |
| 2005/0030232 A1* | 2/2005 | Monebhurrun | H01Q 9/16 343/702 |
| 2005/0068916 A1 | 3/2005 | Jacobsen et al. | |
| 2006/0128436 A1 | 6/2006 | Doi et al. | |
| 2010/0295728 A1 | 11/2010 | Chen | |
| 2013/0115886 A1 | 5/2013 | Khan et al. | |
| 2013/0281159 A1 | 10/2013 | Ai et al. | |
| 2013/0300602 A1 | 11/2013 | Zhou et al. | |
| 2014/0354479 A1 | 12/2014 | Britz et al. | |

OTHER PUBLICATIONS

Chapter 20, Antenna Arrays, Admitted Prior Art.
Constantine A. Balanis, Antenna Theory Analysis and Design, John Wiley & Sons, 2005, Chapter 14-16, pp. 811-999, Admitted Prior Art.

\* cited by examiner

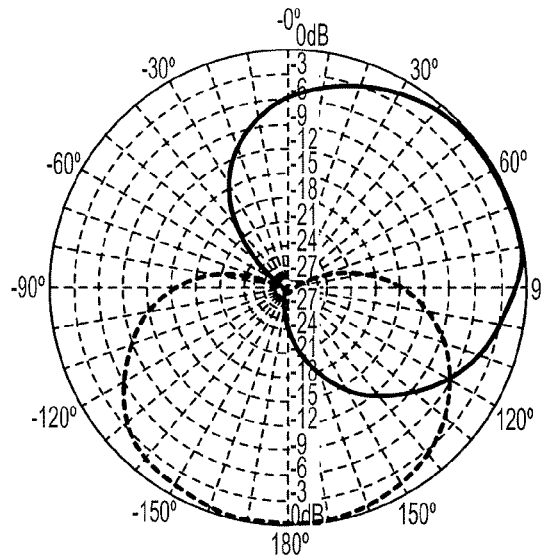 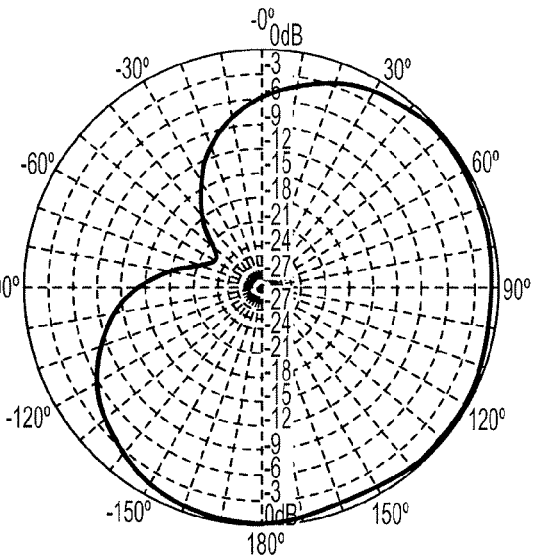
FIG. 5A    FIG. 5B
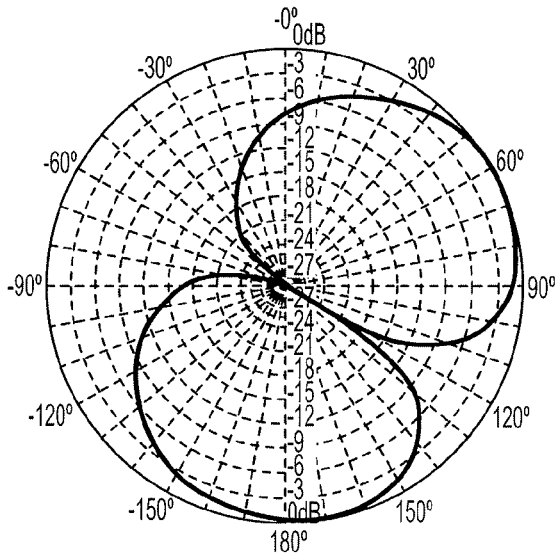
FIG. 5C

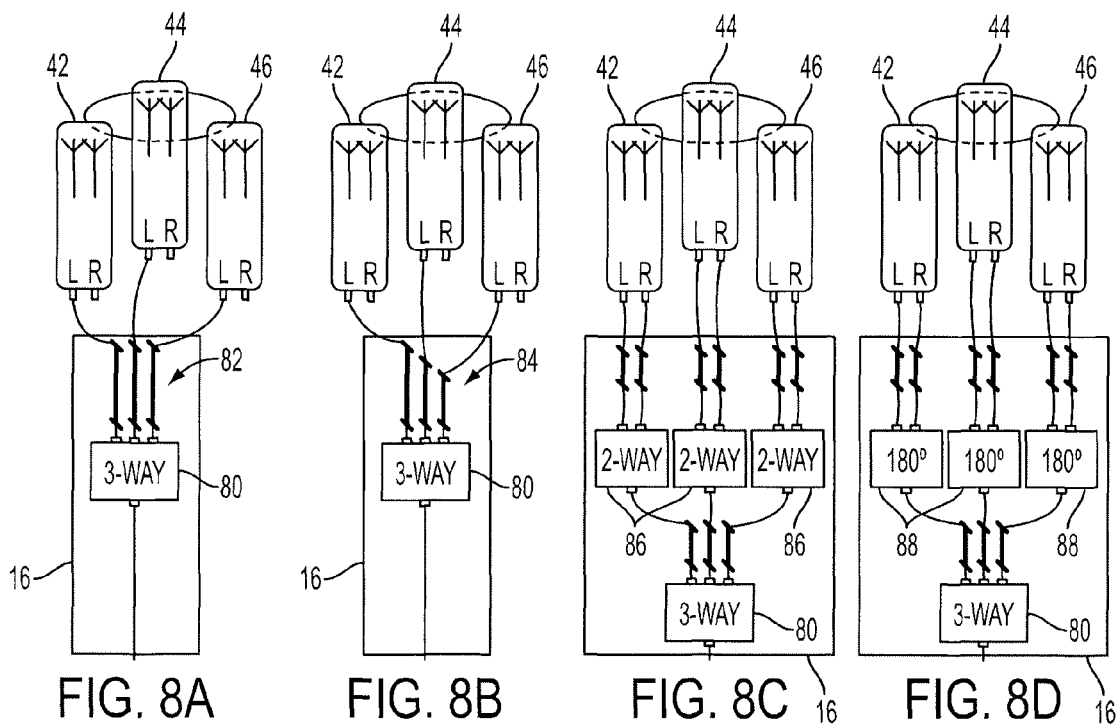

CIRCULAR BASE STATION ANTENNA ARRAY AND METHOD OF RECONFIGURING A RADIATION PATTERN

BACKGROUND OF THE INVENTION

Various aspects of the present disclosure may relate to wireless communications, and, more particularly, to base station antennae radiation pattern control.

To provide increased coverage and throughput, additional base stations (e.g., small-cell base stations) are being deployed along with macro-cell base stations, especially in urban areas. An antenna system of a small-cell base station may be placed around a support structure, such as a pole and may operate as a circular array. Accordingly, the circular array may operate as an array of antenna elements with phase centers located on a circle, and may be used to form a quasi-omnidirectional radiation pattern in the azimuth plane.

Even though a quasi-omnidirectional radiation pattern may be desirable for many scenarios and environments, other types of radiation patterns, and even other shapes of quasi-omnidirectional radiation patterns may be advantageous. For example, a quasi-omnidirectional radiation pattern may initially be a good option for broad area coverage. However, such a pattern may limit throughput if the number of users in a given area is increased. In such a scenario, a different pattern of radiation may be more desirable. However, such a change in shape and/or radiation pattern typically requires replacing the installed base station antenna and/or changing its orientation. Such changes are costly and time consuming.

Accordingly, it would be advantageous if there was a reconfigurable antenna system including an antenna capable of providing various types of radiation patterns without having to be replaced or needing its orientation changed.

SUMMARY OF THE INVENTION

Aspects of the present disclosure are directed to systems and methods for reconfiguring a base station antenna to provide various types of radiation patterns. In one aspect the reconfigurable base station antenna system may include a base station antenna including at least one antenna panel connected to a support structure. Each of the at least one antenna panel includes at least two antenna columns. Each of the at least two antenna columns includes at least one antenna element. A feeder network may be coupled to the at least one antenna panel, and may be configured to cause the base station antenna to form a first quasi-omnidirectional radiation pattern.

In other aspects, the feeder network may be configured to change the first quasi-omnidirectional radiation pattern to another radiation pattern different from the first quasi-omnidirectional radiation pattern.

BRIEF DESCRIPTION OF THE SEVERAL VIEWS OF THE DRAWINGS

The following detailed description of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 5A-5C are illustrations of example radiation patterns realized by a reconfigurable base station antenna system with only two antenna elements (belonging to different antenna panels) energized, according to an aspect of the present disclosure;

FIGS. 8A-8D are schematic diagrams of various feeder network configurations, according to an aspect of the present disclosure;

DETAILED DESCRIPTION OF THE INVENTION

Figure 1A:
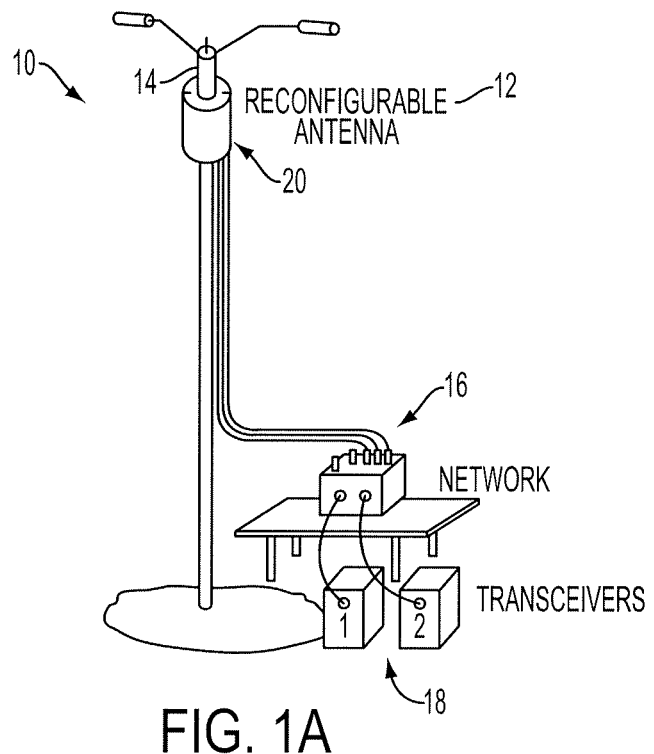
FIG. 1A is an example environment of a cell site employing a reconfigurable base station antenna system, according to an aspect of the present disclosure.

Certain terminology is used in the following description for convenience only and is not limiting. The words "lower," "bottom," "upper" and "top" designate directions in the drawings to which reference is made. Unless specifically set forth herein, the terms "a," "an" and "the" are not limited to one element, but instead should be read as meaning "at least one."

The terminology includes the words noted above, derivatives thereof and words of similar import. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Aspects of the present disclosure may be directed to a reconfigurable antenna system including a reconfigurable antenna capable of providing various types of radiation patterns without having to be replaced or needing its orientation changed. The radiation patterns are for the reception and/or transmission of RF signals. The reconfigurable antenna may create various quasi-omnidirectional radiation patterns of different shapes and different types of radiation patterns (e.g., a sector pattern, a peanut shaped pattern, a butterfly pattern, a cardioid, and the like), depending on the environment. For example, the reconfigurable antenna may be able to create a quasi-omnidirectional radiation pattern with one or more shallow nulls, one or more deep nulls, and/or maxima at particular positions. In other cases, it may be desirable to change the type of radiation pattern to another radiation pattern with a predetermined null and/or maximum to potentially increase the throughput in the direction of a maximum and/or reduce interference in the direction of the predetermined null. Further, adjusting the direction of a null may mitigate any passive inter-modulation (PIM) issues if, for example, a PIM source (e.g., a rusty object), is in the direction of strong radiation.

FIG. 1A is a plan view of a cell site according to an aspect of the present disclosure. The cell site 10 may include a reconfigurable base station (e.g., small-cell) antenna 12 mounted on a support structure 14 (e.g., a street light pole). A feeder network 16 may interface with one or more base station transceivers 18, and may be used for changing a radiation pattern of the antenna 12. For example, the feeder network 16 may process (e.g., commutate, combine, or the like) signals applied to ports of the reconfigurable antenna 12. Alternatively, or additionally, the feeder network 16 may change a phase and/or amplitude of one or more of the signals applied to one or more of the ports 20 of the reconfigurable antenna 12. By these techniques being facilitated, at least in part, by the feeder network 16, the radiation pattern may effectively be altered without changing any components inside the reconfigurable antenna 12, or without changing an orientation of the reconfigurable antenna 12.

Figure 1B:
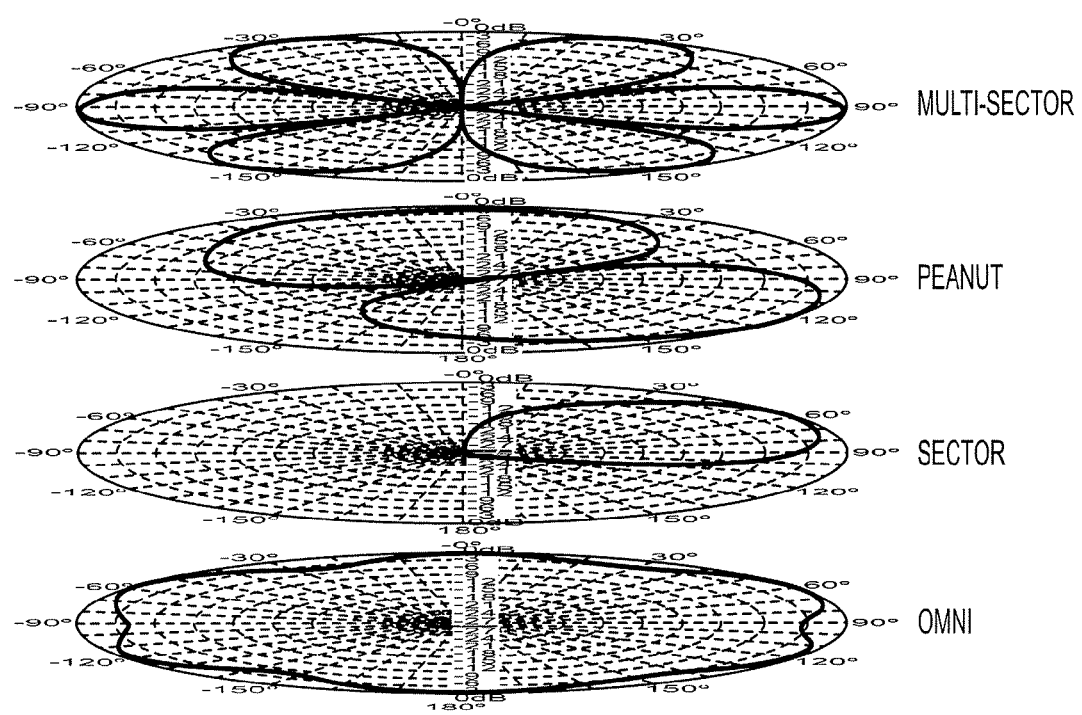
FIG. 1B is an illustration of example radiation patterns realized by a reconfigurable base station antenna system, according to an aspect of the present disclosure.

FIG. 1B illustrates some examples of radiation patterns that may be realized by the reconfigurable antenna 12 according to aspects of the disclosure. Such radiation patterns include but are not limited to, multi-sector, peanut, sector, and omnidirectional radiation patterns.

Figure 2:
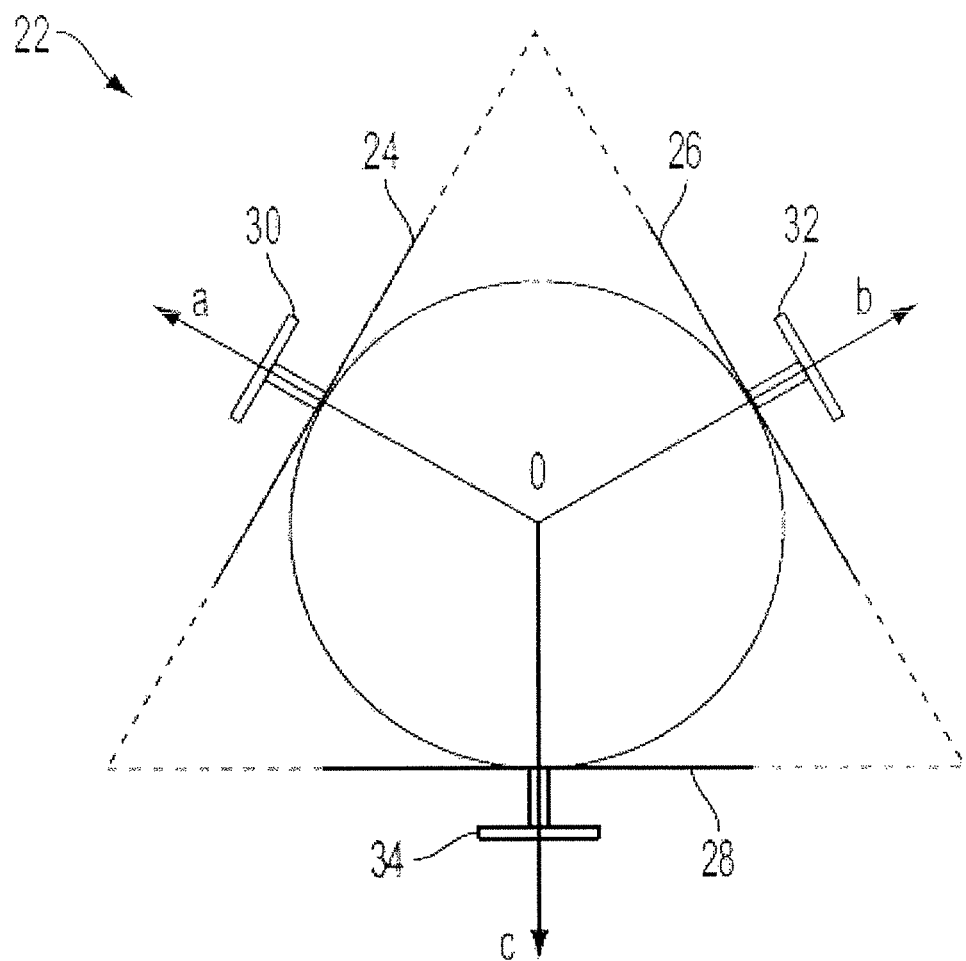
FIG. 2 is a plan view of a prior art base station cell site used to form a quasi-omnidirectional radiation pattern, according to an aspect of the present disclosure.

FIG. 2 illustrates a top view of a conventional antenna 22 comprised of three antenna panels 24, 26, 28 with one column of antenna elements 30, 32, and 34 on each of the three panels 24, 26, 28. The conventional antenna 22 may be mounted around a support structure (e.g., a pole) and may be used for forming a quasi-omnidirectional radiation pattern. In such a configuration, a direction of the maximum of radiation of each of the antenna elements 30, 32, 34 may coincide with the direction of lines a, b, and c connecting the pole center 0 and a phase center (e.g. a point where a radiated field may originate) of each of the antenna elements 30, 32, 34.

Figure 3A:
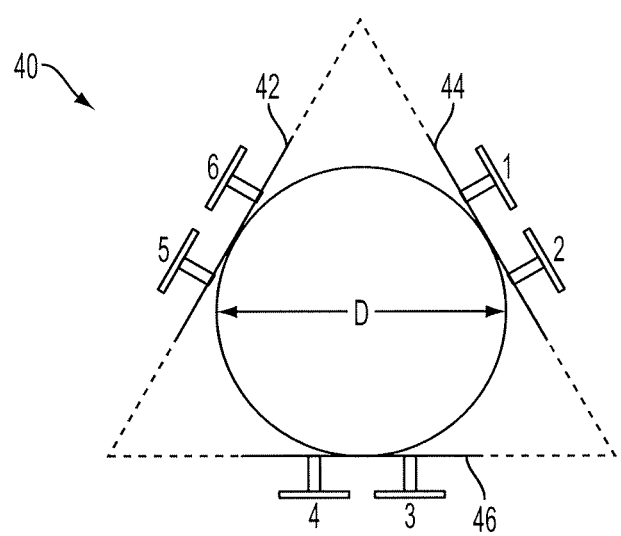
FIGS. 3A-3B are plan views of a reconfigurable base station antenna, according to an aspect of the present disclosure.

FIG. 3A is a plan view of a reconfigurable antenna 40 having a diameter spacing D, and comprising three antenna panels 42, 44, 46. Instead of one column of antenna elements per panel, each antenna element column may be split into two or more antenna element columns. For example, one panel may include antenna element columns 1 and 2, another panel 3 and 4, and yet another panel 5 and 6. Hereafter the term "antenna element column" and "antenna element" may be used interchangeably. The antenna elements 1-6 may be offset from a middle point among the antenna elements 1-6. In other words, the antenna elements may be offset a distance from the lines a, b, c, (described in FIG. 2) respectively. Although only two columns of antenna elements per panel are shown, it should be noted that each panel may include more than two columns of antenna elements, in keeping with the spirit of the disclosure. Further, the reconfigurable antenna may include more than three panels in keeping with the spirit of the disclosure.

Figure 3B:
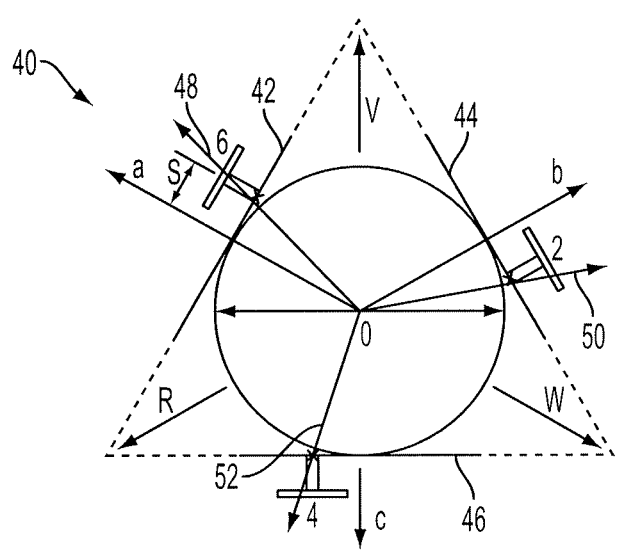

FIG. 3B is a plan view of a configuration of a reconfigurable antenna for creating a quasi-omnidirectional radiation pattern, according to an aspect of the disclosure. For creating such a radiation pattern, either antenna element set (1, 3, 5), or set (2, 4, 6) of the antenna elements 1-6 of FIG. 3A may be energized. In FIG. 3B, the antenna element set (2, 4, 6) is illustrated, and for simplicity purposes, unenergized antenna elements are not shown. As shown, the antenna elements 2, 4, 6 may be offset a distance s from the lines a, b, c, respectively, but the direction of maximum radiation for antenna elements 2, 4, and 6 may still be represented by lines a, b, and c respectively. In contrast to the conventional antenna of FIG. 2, the direction of the maximum of radiation of antenna elements 1-6 does not coincide with the direction of lines connecting the pole center and the phase centers of the antenna elements 1-6, e.g. lines 48, 50, and 52.

Directions R, V, W represent bisecting directions between respective antenna panels. Based, at least in part, on the fact that amplitudes of overlapping beams (e.g., with axially symmetrical shapes) from some of the antenna elements 1-6 may be nearly equal, deep unwanted nulls may potentially appear in these directions R, V, W. For example, in the directions R, V, W, the traveling length difference $\Delta L = \sqrt{3} \cdot s$. Applied to the configuration of FIG. 3B, $\Delta L$ is the traveling length difference for antenna elements 4 and 6 in the direction R.

The corresponding phase difference caused by the offset s may be represented by the following equation:

$$\text{Phase difference} = \sqrt{3} \cdot 2\pi \cdot s/\lambda$$

Depending only on $s/\lambda$, deep nulls may appear in directions R, V, W, even at relatively small values of antenna diameter spacing (e.g., $D/\lambda$). Table 1 below shows several example cases of offset values and corresponding phase differences in the directions R, V, and W.

TABLE 1

| $s/\lambda$ | Phase Difference |
|---|---|
| $\frac{\sqrt{3}}{12} \simeq 0.144$ | 90° |
| $\frac{\sqrt{3}}{9} \simeq 0.192$ | 120° |
| 0.25 | 156° |
| $\frac{\sqrt{3}}{6} \simeq 0.289$ | 180° |
| $\frac{\sqrt{3}}{4} \simeq 0.433$ | 270° |
| $\frac{\sqrt{3}}{3} \simeq 0.577$ | 360° |

As shown above, commonly used half-wavelength spacing $s/\lambda=0.25$ of antenna elements may result in a phase difference of 156 degrees. Such a phase difference may result in deep nulls in the directions R, V, and W, in the case of the in-phase feed, and may result in −13.6 dB null depth.

The above-discussed unwanted nulls may be eliminated by applying feed signals of particular phases, according to aspects of the present disclosure.

FIGS. 4A-4F are examples of quasi-omnidirectional radiation patterns that may be realized by the reconfigurable antenna, through the application of certain feed vectors and various values of s/λ, with D/λ=1. As used herein, a feed vector may represent a set of complex values representing one or more amplitudes and phases of one or more feed signals of a particular antenna element. More specifically, the numerator may represent a normalized amplitude (on a linear scale), and the denominator may represent a phase in degrees. For example, the feed vector {1/180, 1/90, 1/0, 0/0, 0/0, 0/0} may represent the following feed signals of the antenna elements: $1^{st}$ antenna element: amplitude=1, phase=180°; $2^{nd}$ antenna element: amplitude=1, phase=90°; $3^{rd}$ antenna element: amplitude=1, phase=0; and the respective amplitudes and phases of the $4^{th}$, $5^{th}$, and $6^{th}$ antenna elements are zero. As shown, some of the patterns have shallow nulls, and others have deep nulls.

Figure 4A:
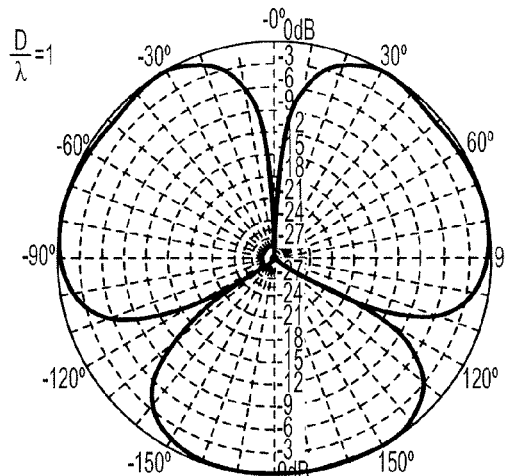
FIGS. 4A-4F are illustrations of example quasi-omnidirectional radiation patterns realized by a reconfigurable base station antenna system using different offsets and phasing, according to an aspect of the present disclosure.
Figure 4B:
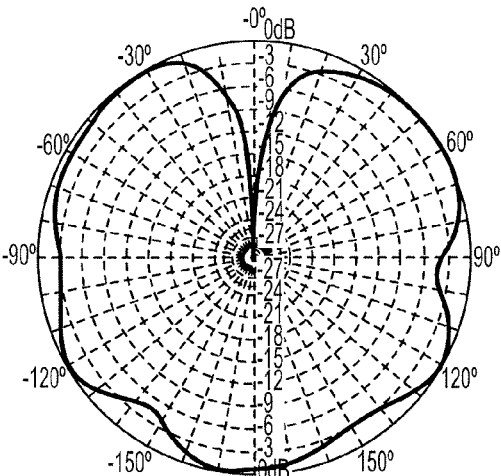

FIG. 4A is a radiation pattern using an in-phase feed vector {0/0, 1/0, 0/0, 1/0, 0/0, 1/0}, and $$\frac{s}{\lambda} = \frac{\sqrt{3}}{6}.$$

As reflected in Table 1 above, such a spacing results in a 180 degree phase difference and deep nulls.

To compensate for such nulls in two of the directions, for example, a phase of one of the feed signals, e.g., antenna element 4, may be inverted, which results in the feed vector {0/0, 1/0, 0/0, 1/180, 0/0, 1/0}, being applied. Consequently, as shown in the radiation pattern of FIG. 4B, only one deep and narrow null exists, which may be used, for example, to mitigate a passive intermodulation (PIM) issue or to aid in eliminating interference in a particular direction.

Figure 4C:
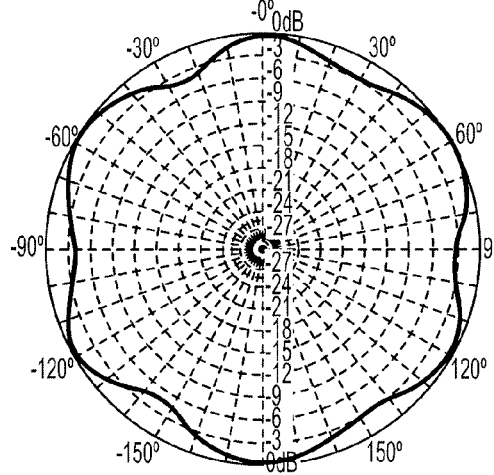
Figure 4D:
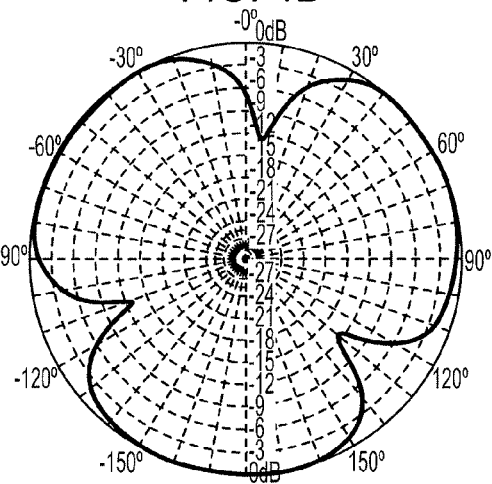

FIG. 4C is a radiation pattern for which nulls have been, at least partly, compensated in all directions. For such a radiation pattern, the antenna may be fed with the feed vector {0/0, 1/0, 0/0, 1/120, 0/0, 1/240} with the spacing $$\frac{s}{\lambda} = \frac{\sqrt{3}}{9}.$$

Radiation patterns realized by the reconfigurable antenna may also be affected by the sign of the phase of the feeding signals. For example, when the even-numbered antenna elements are energized (e.g., 2, 4, 6), inverting the sign in the feed vector applied with respect to FIG. 4C, (e.g., {0/0, 1/0, 0/0, 1/−120, 0/0, 1/−240}) may result in formation of nulls near directions R, V, and W, as shown in the radiation pattern of FIG. 4D. Interestingly enough, when the odd numbered antenna elements are energized (e.g., 1, 3, 5), similar feed vector {1/0, 0/0, 1/−120, 0/0, 1/−240, 0/0} may provide a radiation pattern without nulls, similar to that shown in FIG. 4C.

Figure 4E:
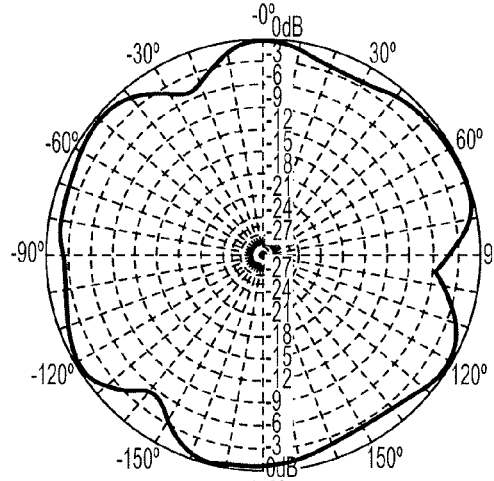

FIG. 4E illustrates a radiation pattern with maxima in R, V, and W directions, and shallow nulls when using the in-phase feed {0/0, 1/0, 0/0, 1/0, 0/0, 1/0} at $$\frac{s}{\lambda} = \frac{\sqrt{3}}{3},$$

which corresponds to a phase difference of 360 degrees.

Figure 4F:
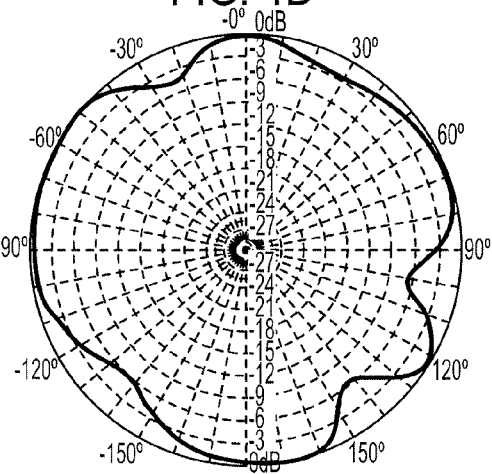

Quasi-omnidirectional patterns with shallow nulls may even be formed in cases when other than even or odd numbered sets of antenna elements are energized. Such a radiation pattern is shown in FIG. 4F, in which case the feed vector {0/0, 1/0, 1/0, 0/0, 0/0, 1/90} with the elements 2, 3, and 6 energized, at s/λ=√3/4 (corresponding to a 270 degree phase difference).

Even though quasi-omnidirectional radiation patterns, such as the various types discussed above with respect to FIGS. 4A-4F, may be considered advantageous in many environments, other types of radiation patterns may also be desirable in certain other environments. Examples of other types of radiation patterns potentially realized by the reconfigurable antenna are shown in FIGS. 5A-5C and FIGS. 6A-6C.

Referring now to FIGS. 5A-5C, the reconfigurable antenna may radiate patterns with only two antenna elements (belonging to different panels) energized. For example, the radiation patterns realized in FIGS. 5A-5C were realized with only antenna elements 1 and 4 energized. As shown in FIG. 5B, a broad radiation pattern with a single null and a single maximum may be formed with the in-phase feed vector and equal amplitudes of antenna elements 1 and 4, with the solid line in FIG. 5A representing the individual pattern created by antenna element 1, and the dotted line representing the individual pattern created by antenna element 4.

FIG. 5C illustrates a radiation pattern having dual null-maxima, which may be formed with an out-of-phase feed vector. Alternatively, FIG. 5B is an illustration of a radiation pattern that may be realized with the antenna elements 1 and 4 in phase. It should be noted that the direction of the null may be changed if another pair of antenna elements is energized, for example, 3 and 6, or 2 and 5.

Figure 6A:
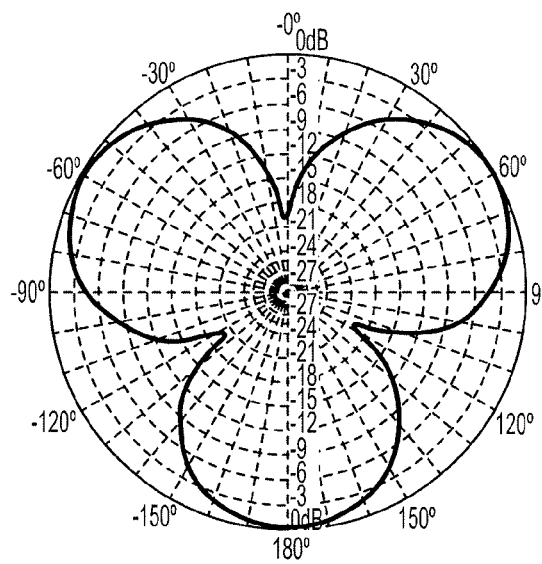
FIGS. 6A-6C are illustrations of example radiation patterns realized by a reconfigurable base station antenna system with all antenna elements on each antenna panel energized, according to an aspect of the present disclosure.
Figure 6B:
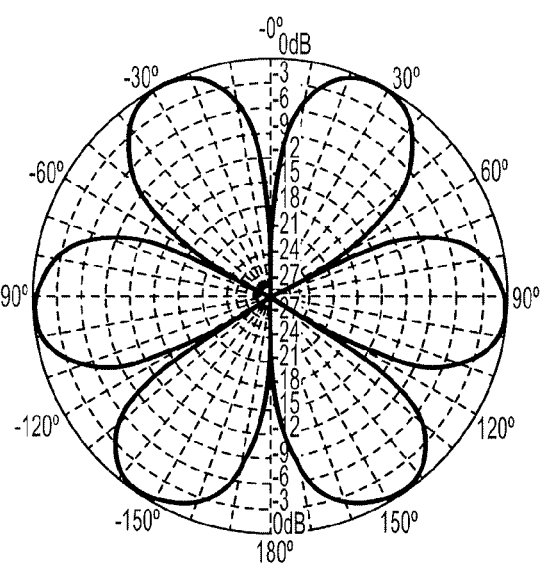
Figure 6C:
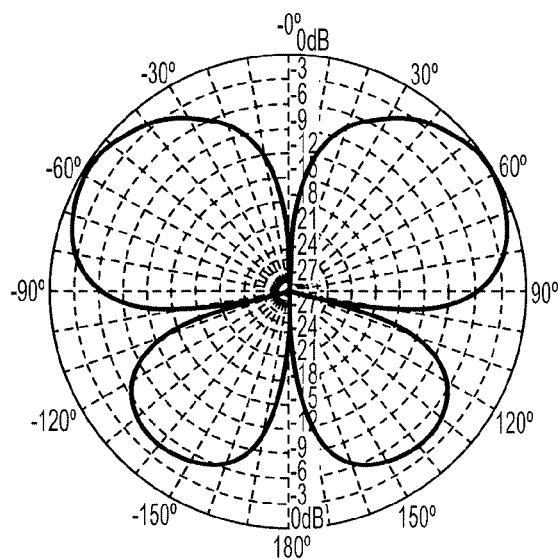

According to aspects of the present disclosure, other radiation patterns may be realized by energizing all the antenna elements, and for example, using signals of equal amplitudes. FIGS. 6A-6C illustrate example radiation patterns of such configurations. More specifically, FIG. 6A may be realized using a feed vector {1/0, 1/0, 1/0, 1/0, 1/0, 1/0} with a spacing s/?=0.25; FIG. 6B may be realized using a feed vector {1/0, 1/180, 1/0, 1/180, 1/0, 1/180} with a spacing s/λ, =0.25; and FIG. 6C may be realized using a feed vector {1/0, 1/0, 1/0, 1/180, 1/180, 1/180} also with a spacing s/λ=0.25.

Figure 7:
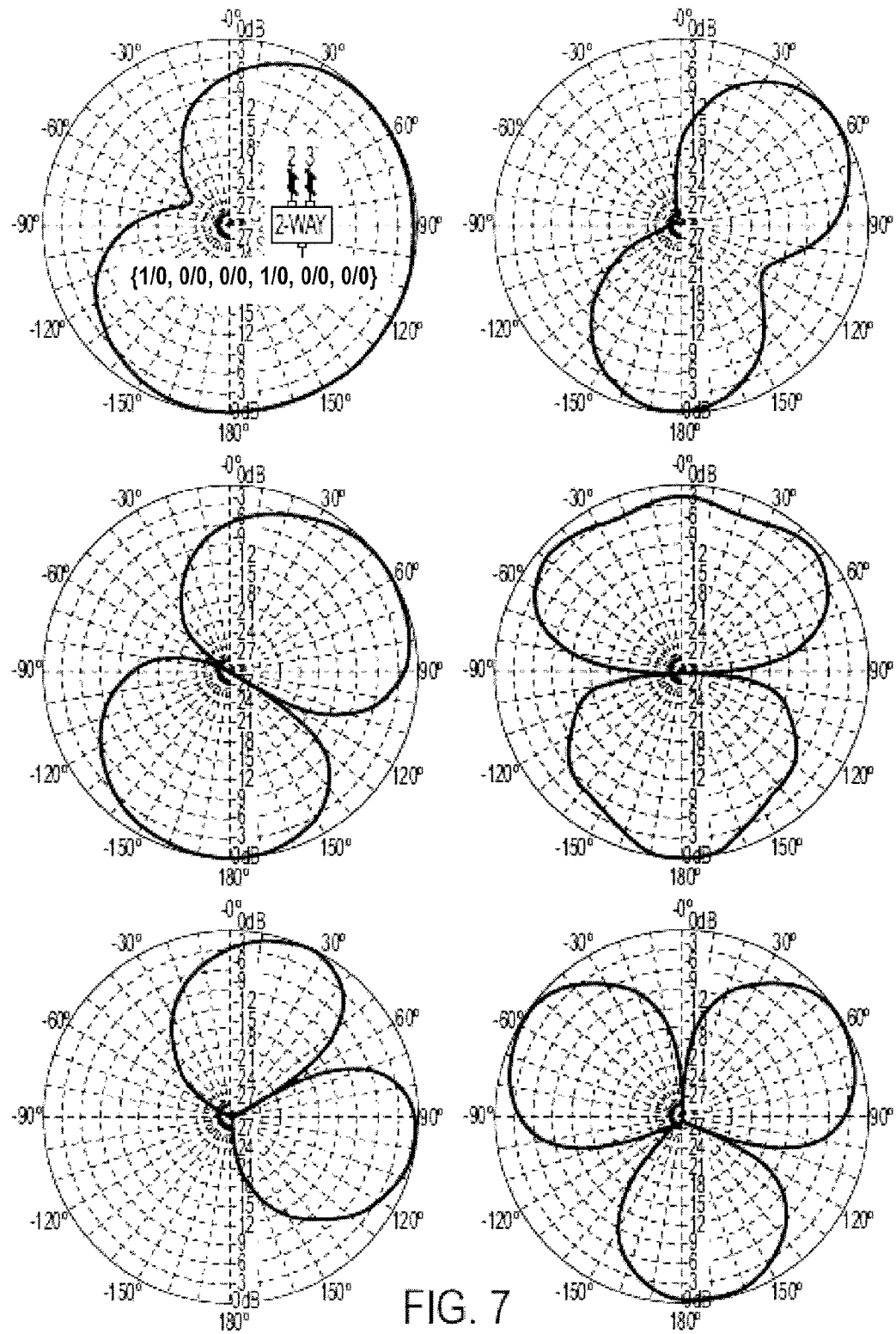
FIG. 7 is an illustration of example radiation patterns realized by the reconfigurable base station antenna system in the form of a look up table, according to an aspect of the present disclosure.
Figure 7:
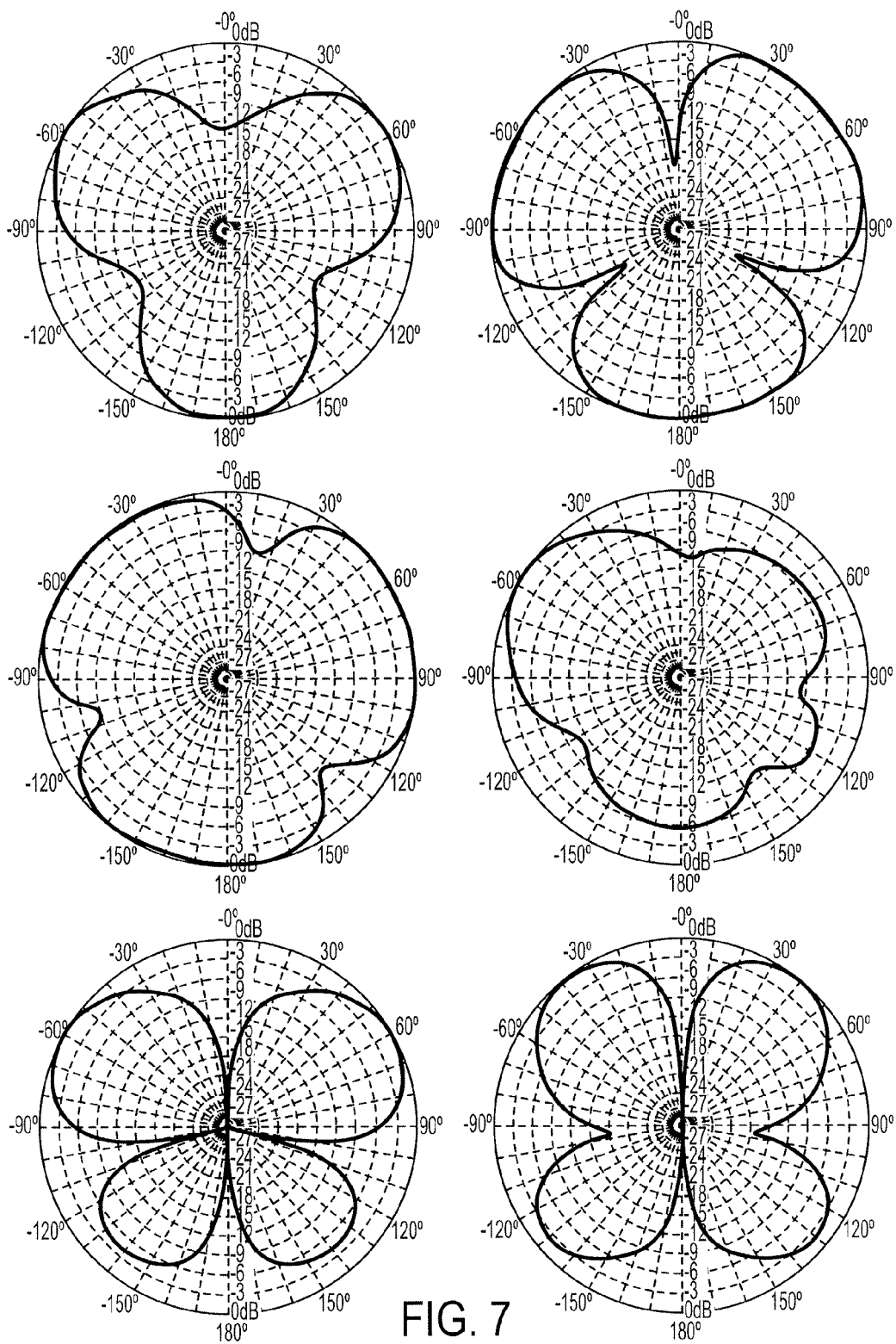
Figure 7:
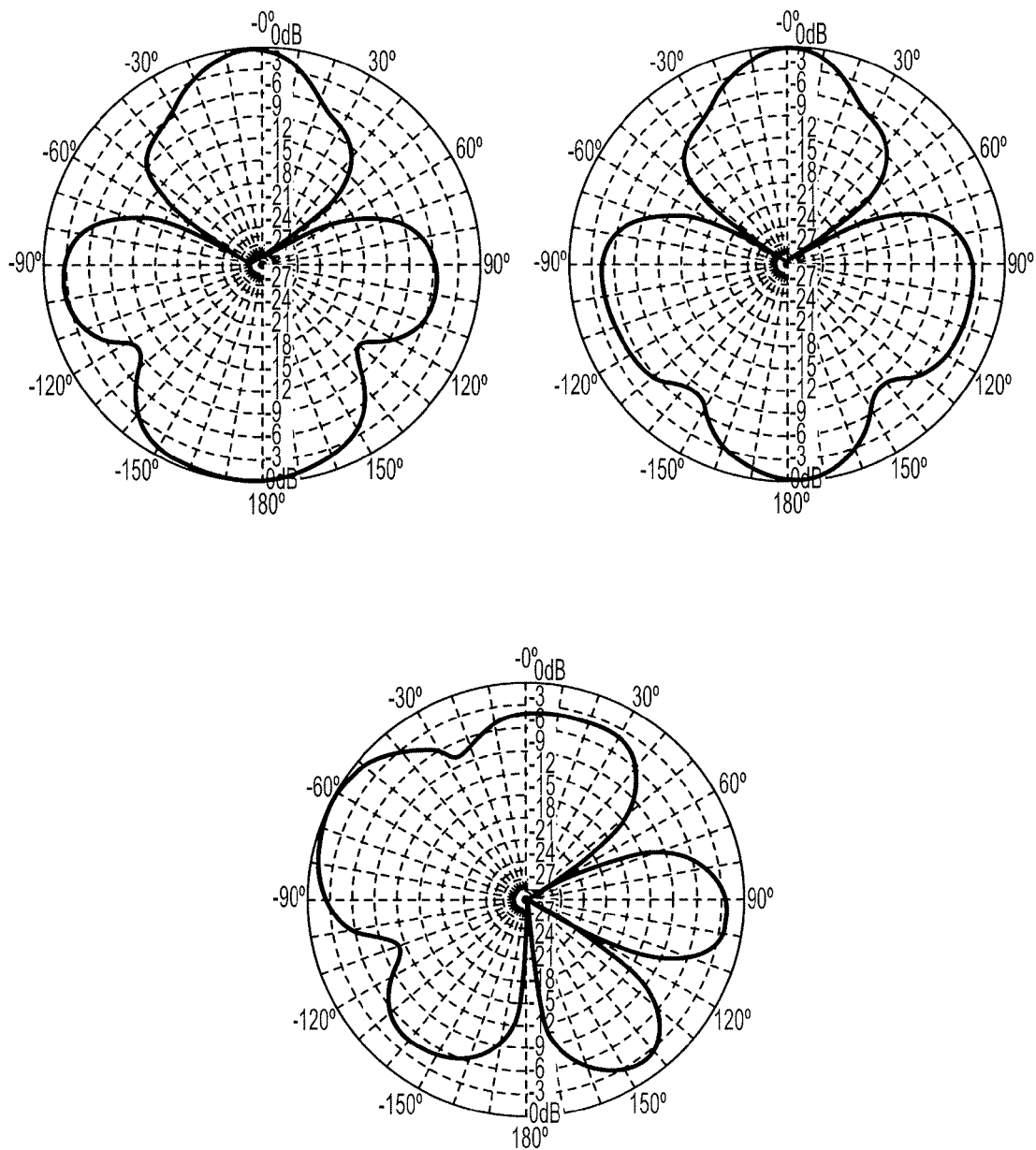

As discussed above, phase differences and radiation patterns may depend, at least in part, on the value D/λ and spacing s/λ As such, assuming that D/λ and spacing s/λ are known, a desired radiation pattern of a circular array of the reconfigurable antenna may be determined for each specific feed vector. For example, through various simulation tools (e.g., Matlab™), a large number of radiation patterns may be simulated by varying the groups of energized antenna elements with varied phases and/or amplitudes of the feed signals of the feed vector. Through these simulations, a large number of radiation patterns may be plotted and stored. Those patterns deemed particularly useful may be selected, categorized, and organized in a lookup table along with their corresponding feed vectors. FIG. 7 is an example listing of radiation patterns which may form part of such a lookup table.

Also, as shown in one of the radiation patterns, a corresponding network schematic and feed vector used to realize the radiation pattern is shown. For the sake of simplicity, only one of the radiation patterns is displaying its corresponding network and feed vector. It should be noted that, in the actual look up table, more or all of the remaining radiation patterns may also display corresponding network details and feed vectors.

To create the above-discussed radiation patterns, the feeder network, (e.g., such as the feeder network 16 in FIG. 1A), may be employed. More specifically, the feeder network may include a switching network to realize the feed vectors listed in the look up table. The feeder network may apply transceiver signals, such as from the transceiver ports of the transceivers, to ports of the reconfigurable antenna. It should be noted that, while this description is provided in the context of applying signals from the transceivers to the reconfigurable antenna, corresponding operations may be applied to signals received by the reconfigurable antenna and the be applied to inputs of the transceivers. The feeder network may selectively apply transceiver signals to some of ports of the reconfigurable antenna in order to create a specific radiation pattern. For forming another radiation pattern, the feeder network may switch the paths of the transceiver signals and apply the transceiver signals to other ports. In this way the transceiver signals may be applied to all antenna ports or only to some of them. The feeder network may also control amplitudes and phases of the transceiver signals applied to the reconfigurable antenna ports. For example, the transceiver signals may flow though switchable paths comprising, for example, one or more power splitters, hybrids (e.g., 90 degree and 180 degree hybrids), and phase shifting circuits such as cables with accurately defined lengths. In some aspects, the feeder network may also process signals by reconnecting cables, which may be done manually or electronically, for example, through the use of RF switches and control software. FIGS. 8A-8D are examples of schematic diagrams coupled to one or more antenna elements 1-6 of each panel 42, 44, 46 of the reconfigurable antenna. In FIGS. 8A-8D, "L" may be used to represent one set of antenna elements (e.g., the even antenna elements 2, 4, 6), while "R" may be used to represent another set of antenna elements (e.g., the odd antenna elements 1, 3, 5). The feeder networks 16 may be used to realize one or more of the above discussed radiation patterns. It also should be noted that feeder networks providing a single fixed radiation pattern may be a part of a larger feeder network 16 providing multiple reconfigurable radiation patterns.

Referring to FIG. 8A, the feeder network 16 may employ a 3-way in-phase power splitter 80 and three equal-length cables 82, with each of the three equal-length cables 82 coupled to one of the antenna elements 1-6, to energize the antenna elements 2, 4, and 6. Such a network may be used to realize the radiation pattern described in connection with FIG. 4A above.

Referring to FIG. 8B, the feeder network 16 may include a 3-way in-phase power splitter 80 and three cables 84 of unequal length. Such cables 84 of unequal length may effect a 120 degree phase difference between neighboring panels 42, 44, 46. In other words, such varying cable lengths may be responsible for providing the feed vector {0/0, 1/0, 0,0, 1/120, 0/0, 1/240} or the feed vector {1/0, 0/0, 1/120, 0/0, 1/240, 0/0}. Optionally, the 120° progressive phase difference between signals may be obtained using a 3-way Butler matrix, as discussed, for example, in U.S. Pat. No. 4,638, 317, the disclosure of which is incorporated herein by reference. The network 16 may be used to generate the radiation pattern described in connection with FIG. 4C.

Referring to FIG. 8C, the feeder network 16 may include a 3-way in-phase power splitter 80 coupled to three 2-way in-phase power splitters 86. As shown, each of the connecting cables may be of equal length. Each of the cables output from the three 2-way power splitters may be coupled to each antenna element 1-6 of each panel 42, 44, 46 to energize all antenna elements (e.g., 1-6) of the reconfigurable antenna. Such a network 16 may be used to provide radiation patterns with three narrow beams as described in connection with FIG. 6A.

Referring to FIG. 8D, the feeder network 16 may include a 3-way in-phase power splitter 80 coupled to three 2-way out-of-phase power splitters 88. As shown, each of the connecting cables may be of equal length. Each of the cables output from three 2-way out-of-phase power splitters 88 may be coupled to a respective antenna element 1-6 of a respective panel 42, 44, 46 to energize all antenna elements (e.g., 1-6) of the reconfigurable antenna. Such a network 16 may be used to provide radiation patterns with six narrow beams as described in connection with FIG. 6B.

According to aspects of the present disclosure, changing a configuration of the radiation pattern may be done by reconnecting one or more different antenna ports to an RF signal or by changing a phase and/or amplitude of one or more signals arriving at the one or more of the antenna ports. Reconnections may be performed manually. For example, a technician or operation at the cell site may physically change one or more hardware connections using individual components, such as power splitters, 90-degree hybrids, 180-degree hybrids, and cables with specified phases (e.g., FIG. 8D). A minimal set of components sufficient for forming any of the desired patterns from a look up table may constitute the feeder network 16 when employing manual reconnections.

According to other aspects of the present disclosure, reconnections may be performed electronically with RF switches commutating the signals' traveling paths. With electronically performed reconnections, components, such as power splitters, hybrids, and phase shifting circuits, may be printed on a printed circuit board.

Figure 9A:
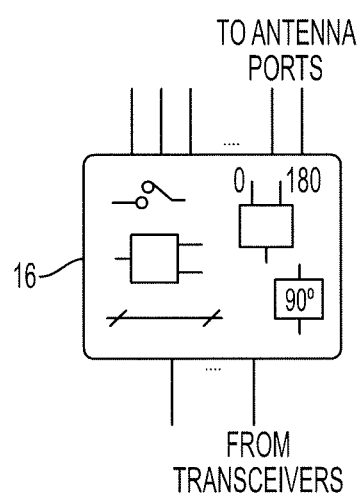
FIG. 9A is a schematic diagram showing that the feeder network may be separate from the reconfigurable antenna, according to an aspect of the present disclosure.

Referring now to FIG. 9A, according to aspects of the present disclosure, the feeder network 16 may be realized as a standalone unit separate from the reconfigurable antenna itself. For example, the standalone feeder network may comprise the above discussed RF switches, power splitters, 90-degree and/or 180 degree hybrids, and/or phase shifting circuits.

Figure 9B:
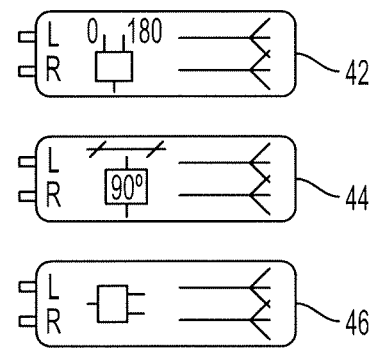
FIG. 9B is a schematic diagram showing that the feeder network may be incorporated in the reconfigurable antenna, according to an aspect of the present disclosure.

Referring now to FIG. 9B, according to other aspects of the present disclosure, the feeder network may be incorporated into reconfigurable antenna itself. For example, one or more components (e.g., RF switches, power splitters, 90-degree and/or 180 degree hybrids, and/or phase shifting circuits) may be incorporated as a part of each of the antenna panels 42, 44, 46 of the reconfigurable antenna. In such a case, a desired built-in configuration of the radiation pattern may be implemented in a factory during assembly by using the look up table and a set of standard parts. As such, the need to design a new antenna for each new desired radiation pattern is avoided. It should be noted that the components shown in each antenna panel 42, 44, 46 of FIG. 9B is shown by way of non-limiting example only. Additional components may be included in each antenna panel in still keeping with the disclosure.

Figure 10:
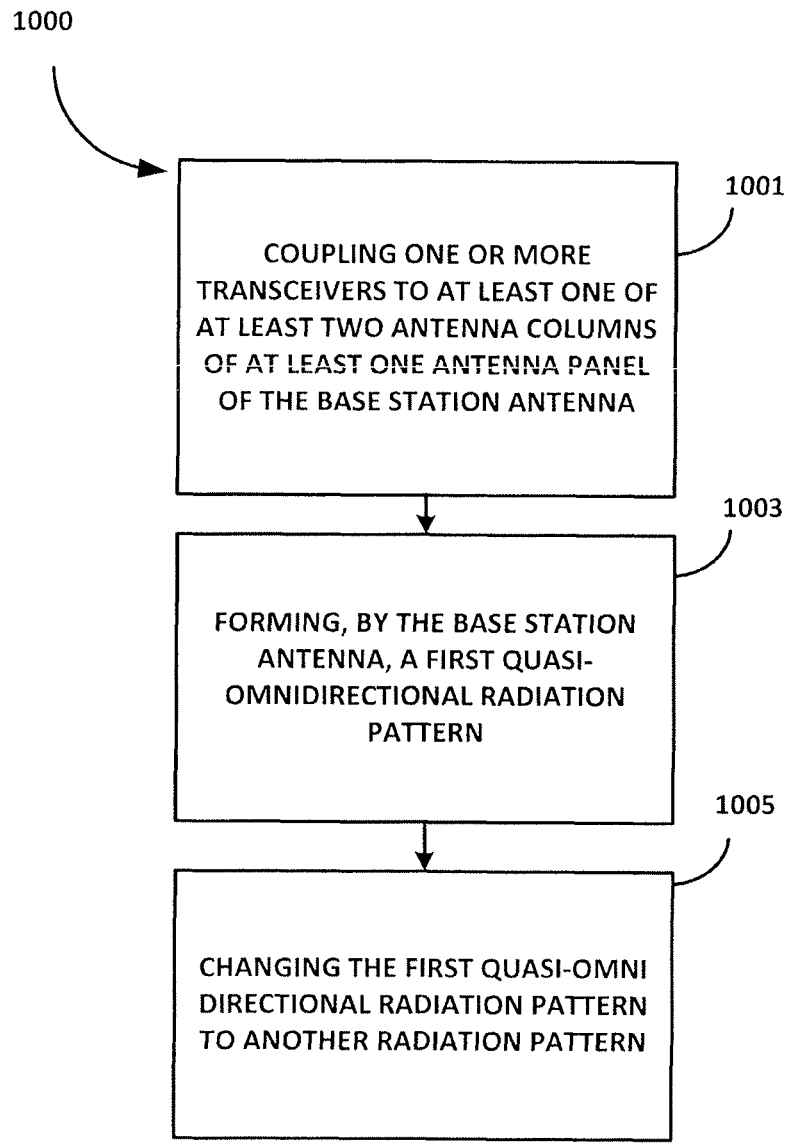
FIG. 10 is a method of reconfiguring a radiation pattern of a base station antenna according to an aspect of the present disclosure.

FIG. 10 is a flow chart illustrating a method 1000 for reconfiguring a radiation pattern of a base station antenna. At Block 1001, one or more transceivers may be coupled to at least one of at least two antenna columns of at least one antenna panel of the base station antenna. At Block 1003, base station antenna may form a first quasi-omnidirectional radiation pattern. At Block 1005, the first quasi-omnidirectional radiation pattern may be reconfigured.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative blocks described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various embodiments of the invention have now been discussed in detail; however, the invention should not be understood as being limited to these embodiments. It should also be appreciated that various modifications, adaptations, and alternative embodiments thereof may be made within the scope and spirit of the present invention.

The invention claimed is:

1. A reconfigurable base station antenna system comprising:
 a base station antenna including a plurality of antenna panels connected to a support structure, wherein each of the antenna panels include at least two antenna columns, wherein each of the at least two antenna columns includes at least one antenna element; and
 a feeder network coupled to at least one of the at least two antenna columns of each of the antenna panels, the feeder network being configured to cause the base station antenna to form a first quasi-omnidirectional radiation pattern using a first subset of the antenna columns that comprises less than all of the antenna columns.

2. The system of claim 1, wherein the feeder network is reconfigurable to feed a second subset of the antenna columns that is different than the first subset of antenna columns to configure the base station antenna to change from the first quasi-omni directional radiation pattern to another radiation pattern.

3. The system of claim 1, wherein the feeder network is configured to change the first quasi-omnidirectional radiation pattern to another radiation pattern different from the first quasi-omnidirectional radiation pattern.

4. The system of claim 3, wherein the another radiation pattern is a second quasi-omni directional radiation pattern.

5. The system of claim 3, wherein the another radiation pattern is not a quasi-omnidirectional radiation pattern.

6. The system of claim 3, wherein the feeder network is configured to change the first quasi-omnidirectional radiation pattern to another radiation pattern by changing one or more antenna ports to which one or more of the signals is applied to the base station antenna.

7. The system of claim 1, wherein the first quasi-omnidirectional radiation pattern includes one or more maxima or one or more nulls at one or more predetermined positions.

8. The system of claim 1, wherein the first quasi-omnidirectional radiation pattern includes a single null.

9. The system of claim 1, wherein the base station antenna includes more than two antenna panels.

10. A reconfigurable base station antenna system comprising:
 a base station antenna including a plurality of antenna panels connected to a support structure, wherein each of the antenna panels include at least two antenna columns, wherein each of the at least two antenna columns includes at least one antenna element; and
 a feeder network coupled to at least one of the at least two antenna columns of each of the antenna panels, the feeder network being configured to cause the base station antenna to form a first quasi-omnidirectional radiation pattern,
 wherein the feeder network is configured to change the first quasi-omnidirectional radiation pattern to another radiation pattern by changing an amplitude of one or more signals applied to the base station antenna.

11. The system of claim 3, wherein the feeder network is configured to change the first quasi-omnidirectional radiation pattern to another radiation pattern by changing a phase of one or more of the signals applied to the base station antenna.

12. A reconfigurable base station antenna system comprising:
 a base station antenna including a plurality of antenna panels connected to a support structure, wherein each of the antenna panels include at least two antenna columns, wherein each of the at least two antenna columns includes at least one antenna element; and
 a feeder network coupled to at least one of the at least two antenna columns of each of the antenna panels, the feeder network being configured to cause the base station antenna to form a first quasi-omnidirectional radiation pattern,
 wherein the feeder network includes a Butler matrix or at least two cables of different lengths, wherein the Butler matrix or the at least two cables are configured to provide a 120 degree phase difference between signals of one of the at least two antenna columns of a first of the antenna panels and signals of one of the at least two antenna columns of a second of the antenna panels.

13. A method for reconfiguring a radiation pattern of a base station antenna, the base station antenna including a plurality of antenna panels, each antenna panel having at least two antenna columns, each of the at least two antenna columns comprising one or more antenna elements, the method comprising:
- coupling a transceiver to at least one of the antenna columns of each antenna panel of the base station antenna;
- configuring a feeder network coupled between the transceiver and the base station antenna to form a first quasi-omnidirectional radiation pattern at the base station antenna; and
- thereafter reconfiguring the feeder network to change the first quasi-omnidirectional radiation pattern to a second radiation pattern that is different than the first quasi omnidirectional radiation pattern.

14. The method of claim 13, wherein the changing comprises changing an amplitude of one or more signals applied to the base station antenna.

15. The method of claim 13, wherein the changing comprises changing a phase of one or more signals applied to the base station antenna.

16. The method of claim 13, wherein the changing a phase comprises one of applying at least two cables of different lengths or applying a Butler matrix to provide a 120-degree phase difference between one of the antenna columns of one of the antenna panels, and at least one of the antenna columns of another of the antenna panels.

17. The method of claim 13, wherein the first quasi-omnidirectional radiation pattern includes one or more maxima or one or more nulls at one or more predetermined positions.

18. The method of claim 13, wherein the first quasi-omnidirectional radiation pattern includes a single null.

19. The method of claim 13, wherein the base station antenna includes more than three antenna panels.

20. The method of claim 13, wherein the feeder network uses a first subset of the antenna columns that comprises less than all of the antenna columns to form the first quasi-omnidirectional radiation pattern.

21. The method of claim 20, wherein the feeder network uses a second subset of the antenna columns that is different than the first subset of antenna columns to form the second radiation pattern.

* * * * *

UNITED STATES PATENT AND TRADEMARK OFFICE
CERTIFICATE OF CORRECTION

PATENT NO. : 9,722,326 B2
APPLICATION NO. : 14/668037
DATED : August 1, 2017
INVENTOR(S) : Chistyakov et al.

It is certified that error appears in the above-identified patent and that said Letters Patent is hereby corrected as shown below:

In the Specification

Column 2, Lines 53-54: Combine Lines 53 and 54 to read continuously as one paragraph:
-- one. The terminology includes the words noted above, deriva- --

Column 4, Line 37: Delete "√3·2π·s/λ" and insert -- $\sqrt{3} \cdot 2\pi \cdot s/\lambda$ --
Line 38: Delete "on s/Δ," and insert -- on s/λ, --

Column 6, Line 15: Delete "s/λ=√3/4" and insert -- $s/\lambda = \sqrt{3}/4$ --
Line 48: Delete "spacing s/?=0.25" and insert -- spacing s/λ=0.25 --

Column 7, Line 20: Delete "and the be applied" and insert -- and applied --

In the Claims

Column 10, Claim 2, Line 5: Delete "first quasi-omni directional" and insert -- first quasi-omnidirectional --

Claim 4, Line 13: Delete "second quasi-omni directional" and insert -- second quasi-omnidirectional --

Column 11, Claim 13, Lines 16-17: Delete "first quasi omnidirectional" and insert -- first quasi-omnidirectional --

Signed and Sealed this
Third Day of July, 2018

Andrei Iancu
*Director of the United States Patent and Trademark Office*